United States Patent [19]
Helmering

[11] Patent Number: 5,963,922
[45] Date of Patent: Oct. 5, 1999

[54] SYSTEM FOR GRAPHICALLY MAPPING RELATED ELEMENTS OF A PLURALITY OF TRANSACTIONS

[76] Inventor: Paul F. Helmering, 55 Graeler Dr., St. Louis, Mo. 63146

[21] Appl. No.: 08/806,437

[22] Filed: Feb. 26, 1997

Related U.S. Application Data

[60] Provisional application No. 60/012,558, Feb. 29, 1996.

[51] Int. Cl.[6] ........................................... G06F 19/00
[52] U.S. Cl. ..................................... 705/35; 705/1
[58] Field of Search ............................. 705/35, 1

[56] References Cited

U.S. PATENT DOCUMENTS

| | | | |
|---|---|---|---|
| 4,370,707 | 1/1983 | Phillips et al. | 364/200 |
| 4,742,457 | 5/1988 | Leon et al. | 364/408 |
| 4,823,265 | 4/1989 | Nelson | 364/408 |
| 4,831,524 | 5/1989 | Furgerson | 364/300 |
| 5,202,985 | 4/1993 | Goyal | 707/4 |

OTHER PUBLICATIONS

G. Baylor et al., "A Chess Mating Combinations Program," Computer Chess Compendiu, , David Levy ed., 1988, pp. 196–212 plus 4 pages front matter (1 page verso, 2 pp. table of contents, 1 page preface.

A Kierulf, et al., "Every Interactive System Evolves Into Hyperspace: The case of the Smart Game Board," Hypertext/Hypermedia 1991, H. Maurer ed., May 1991, pp. 174–180 plus one page INSPEC abstract (Springer–Verlag, ISBN 3 540 541454).

Helmering, "The History of Chess Maps," 1998, single page, http://www.chessmaps.com/cmhis.htm, Oct. 1998.

Helmering, "Chess Maps," Chess Life, Oct. 1997, p. 70.

Helmering, "Chess Maps Software Version 1.0," product brochure, mailed Oct. 1998, one page.

Helmering, "Chess Maps Description," product brochure mailed Oct. 1998, one page.

*Primary Examiner*—Allen R. MacDonald
*Assistant Examiner*—Penny Caudle
*Attorney, Agent, or Firm*—Senninger, Powers, Leavitt & Roedel

[57] ABSTRACT

A system for use in mapping items such as financial transactions. Each transactions has line entries with each line entry relating to a particular object, such as an account. Each line entry has an entry in a first field or in a second field such as money entries in debit and credit fields. The system provides a graphical, visual representation linking objects (accounts) and illustrating (cash) flow between the objects (accounts). An item (transaction) memory stores entries relating to the items (transactions). A first object (account) memory stores entries relating to a first object (account). A second object (account) memory stores entries relating to a second object (account). An interface, keyboard or scanner inputs the line entries of the items (transactions) into the appropriate object (account) memory. A search engine searches the memories and locates the line entries which relate to each of the objects, such as entries which contribute money to or distribute money from an account. A graphics module responsive to the search engine and to the located line entries creates a map interrelating the (cash) flow between the objects (accounts) whereby the map provides the graphical representation interrelating the objects (accounts).

17 Claims, 6 Drawing Sheets

FIG. 1

TRANSACTION 1:

ACCOUNT BOX (IN FIGURE 2) — LINE NUMBER (IN FIGURE 2)

| | | ACCOUNT | DESCRIPTION | DEBIT | CREDIT |
|---|---|---|---|---|---|
| LINE ENTRY | 1 | 525-110 (202) | SUPPLIES G&A (221) | 735.43 | |
| | 2 | 525-200 (204) | SUPPLIES PD (222) | 341.58 | |
| | 3 | 525-400 (206) | SUPPLIES SB(223) | 914.20 | |
| | 4 | 525-500 (208) | SUPPLIES E/ON (224) | 1879.07 | |
| | 5 | 525-600 (211) | SUPPLIES ASSC (225) | 101.78 | |
| | 6 | 525-700 (213) | SUPPLIES DB (226) | 18.66 | |
| | 7 | 625-999 (218) | SUPPLIES (220) | | 3990.39 |

TRANSACTION 2:

| | ACCOUNT | DESCRIPTION | DEBIT | CREDIT |
|---|---|---|---|---|
| 1 | 555-110 (203) | TELEPHONE G&A (228) | 474.75 | |
| 2 | 555-200 (205) | TELEPHONE PD (229) | 220.5 | |
| 3 | 555-400 (207) | TELEPHONE SB (230) | 590.15 | |
| 4 | 555-500 (209) | TELEPHONE E/ON (231) | 1213.02 | MONEY ENTRY |
| 5 | 555-600 (212) | TELEPHONE ASSC (232) | 65.69 | IN DEBIT FIELD |
| 6 | 555-700 (214) | TELEPHONE DB (233) | 11.86 | |
| 7 | 655-999 (219) | TELEPHONE (227) | | 2575.97 |

TRANSACTION 3:

| | | ACCOUNT | DESCRIPTION | DEBIT | CREDIT |
|---|---|---|---|---|---|
| A | 1 | 201-010 (216) | PAYABLES (235) | | 1601.14 |
| | 2 | 203-010 (217) | CURR OBLIG (234) | 1601.14 | |
| B | 3 | 201-010 (216) | PAYABLES (237) | | 125.61 |
| | 4 | 567-500 (210) | EQPT LEASES E/ON (236) | 125.61 | |
| C | 5 | 201-010 (216) | PAYABLES (239) | | 592.86 |
| | 6 | 931-900 (215) | INTEREST EXPENSE (238) | 592.86 | |

MONEY ENTRY IN CREDIT FIELD

TRANSACTION 4:

| | ACCOUNT | DESCRIPTION | DEBIT | CREDIT |
|---|---|---|---|---|
| 1 | 201-010 (216) | PAYABLES (240) | | 2.93 |
| 2 | 517-100 (201) | MEALS MKTG (241) | 2.93 | |

TRANSACTION 5:

| | ACCOUNT | DESCRIPTION | DEBIT | CREDIT |
|---|---|---|---|---|
| 1 | 625-999 (218) | SUPPLIES (242) | 66.00 | |
| 2 | 655-999 (219) | TELEPHONE (243) | | 66.00 |

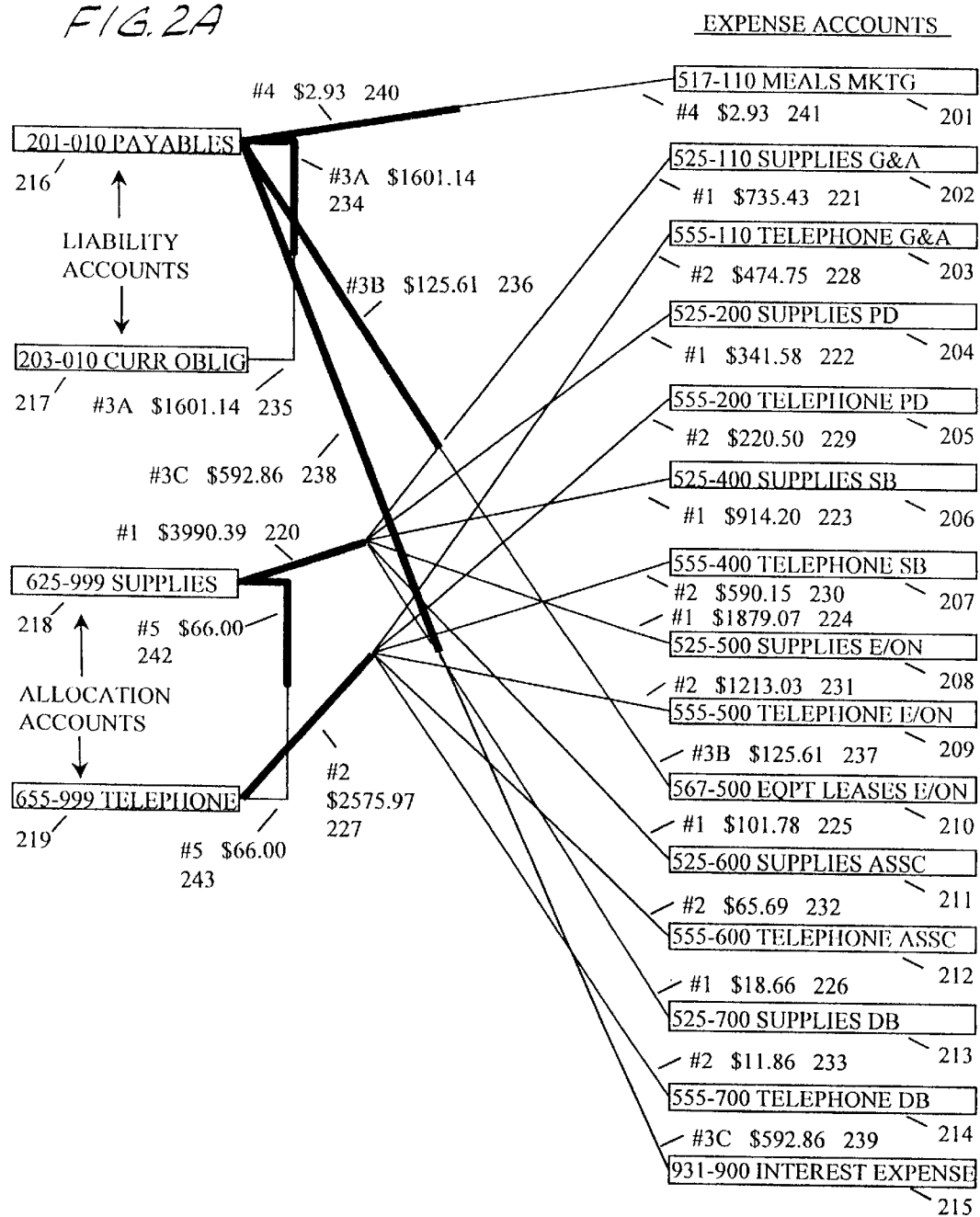

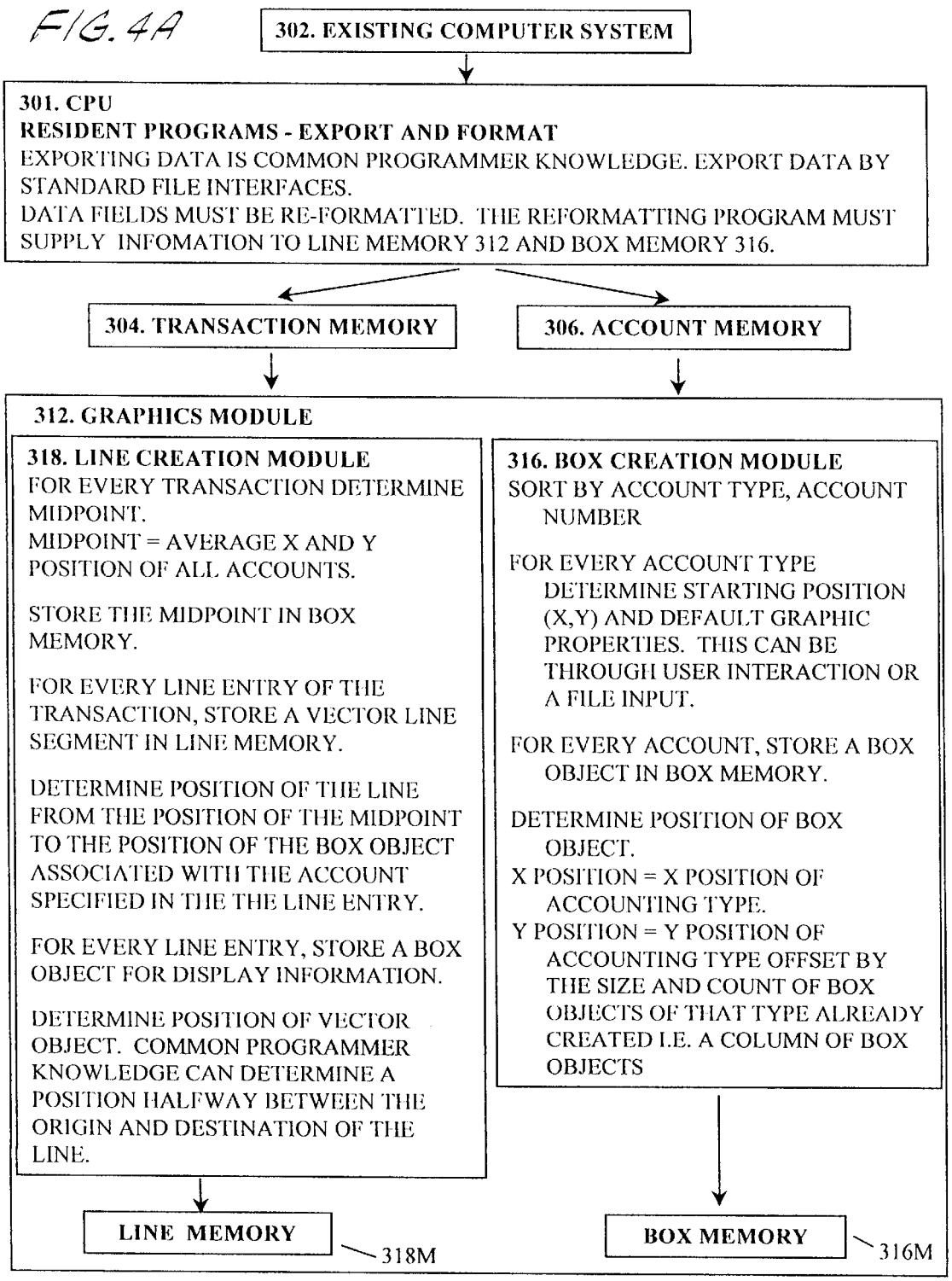

SYSTEM FOR GRAPHICALLY MAPPING RELATED ELEMENTS OF A PLURALITY OF TRANSACTIONS

This application claims priority to provisional application Ser. No. 60/012,558 filed Feb. 29, 1996.

BACKGROUND OF THE INVENTION

1. Field of the Invention

This invention generally relates to systems for tracking items such as transactions and, in particular, a system which interfaces with modules of accounting systems, packaged or custom built, to generate a visual map of the cash flow resulting from a plurality of transactions.

2. Description of the Prior Art

Accounting Packages allow users to list account numbers or to list transaction line entries by transaction number or to list transaction line entries by account number. These systems can represent object 1's relationship to object 2; or object 1's and object 2's relationship to x; but these current systems cannot represent object 1's relationship to object 2 and object 2's relationship to object 3. In Artificial Intelligence terminology, these current systems would be considered a search 1 level deep. There is a need for a system which can represent a search n levels deep. There is also a need for a system which can visualize the n level deep search using a visual language.

SUMMARY OF THE INVENTION

It is an object of this invention to provide a system which provides a graphical visual representation linking accounts and illustrating cash flow showing money contributing to an account and showing money distributed from an account.

It is another object of this invention to provide a system which provides a graphical visual representation liking accounts so that cash can be visually tracked and abnormal cash flow patterns be easily identified from a plurality of transactions, and so that abnormal cash flow patterns can be easily compared to normal cash flow patterns.

It is another object of this invention to provide a system which provides a graphical visual representation linking accounts so that design models can be visually evaluated or automatedly tested to identify redundancies, inconsistencies, or unnecessary processing components; or to provide a graphical representation of system evolution or reengineering.

It is another intention of this invention to provide a system which operates to generate maps which are derived from historical data, the maps illustrating various information files, each file having line entries, each line entry relating to a particular object so that the textual system can be visualized.

It is another object of this system to provide a visual transaction map which is educational and which graphically presents documentation for user training and system understanding.

It is another object of this system to provide graphical auditing and information control.

It is another object of this system to provide graphical maps from multiple input formats.

In one form, the invention comprises a system for use in mapping items, each item having line entries, each line entry relating to a particular object. The system provides a graphical, visual representation linking objects and illustrating flow between the objects. An item memory stores entries relating to the items. A first object memory stores entries relating to a first object. A second object memory stores entries relating to a second object. An input inputs the line entries of the items into the item memory and into the appropriate object memory. A search engine searches the item memory and the object memories and locates the line entries which relate to each of the objects. A graphics module responsive to the search engine and to located line entries creates a map interrelating the flow between the objects whereby the map provides the graphical representation interrelating the objects.

Other objects and features will be in part apparent and in part pointed out hereinafter.

BRIEF DESCRIPTION OF THE DRAWINGS

FIG. 1 is a table of five (5) transactions from a general ledger module.

FIG. 2A is a map according to the invention illustrating the cash flow between liability accounts, allocation accounts, allocation accounts and expense accounts, and liability and expense accounts, showing cash flow of the five transactions of FIG. 1.

FIG. 4A is a flow chart of the operation of a graphics module according to the invention illustrating the population of line memory 318M and the box memory 316M.

FIG. 5 is a directed graph (tree diagram) according to the invention illustrating the movement of chess pieces of three different games 1–3 which begin with the same move (c4 to c5).

BRIEF DESCRIPTION OF THE APPENDIX

Figure 2B:
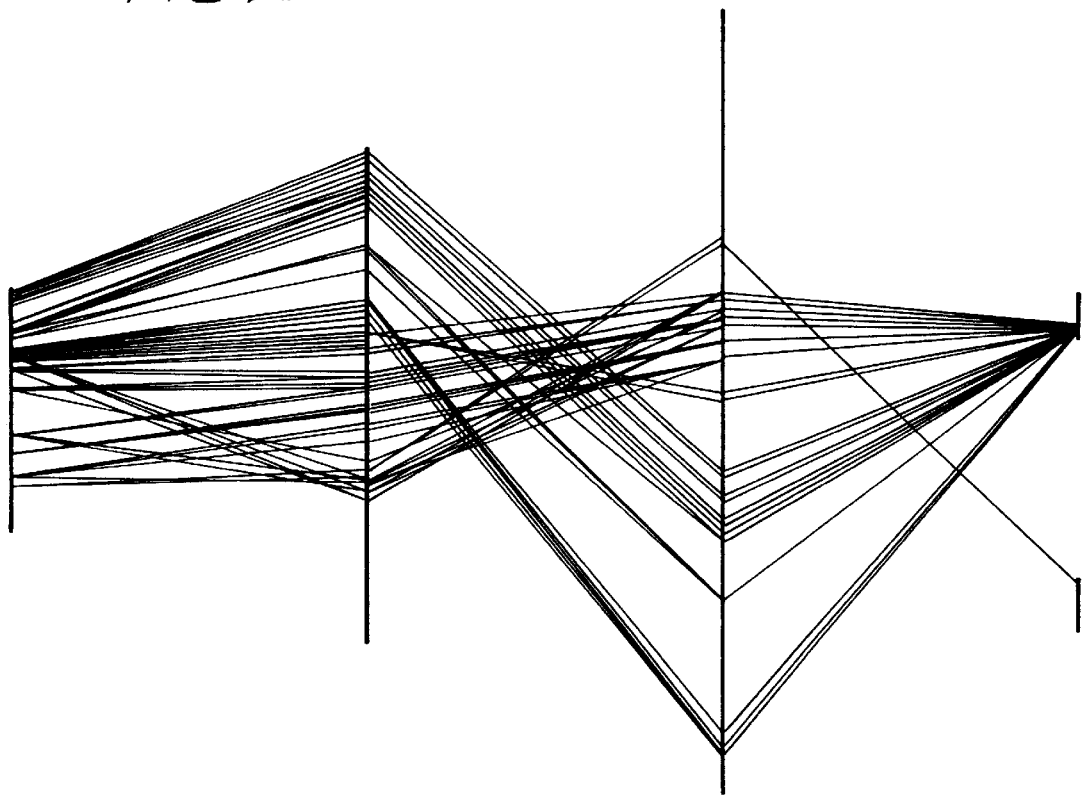
FIG. 2B is the map using the same protocols as FIG. 2A illustrating the multiple levels of cash flow of the five transactions of FIG. 1.

Pages A2–A18, A22–A82 and A183–A200 of Appendix 1 are the programmer documentation for the accounting maps processing system according to the invention.

Pages A83–A146 and A201–A209 of Appendix 1 are the source code listing for the accounting maps processing system according to the invention.

Pages A19–21 and A147–182 of Appendix 1 are the description of the programmer documentation, processing environment and source code listing for the chess maps processing system according to the invention.

Corresponding reference characters indicate corresponding parts throughout the drawings.

DETAILED DESCRIPTION OF PREFERRED EMBODIMENTS

In general, the system 300 of the invention is a processing system and visual language which maps items (e.g., financial transactions) having line entries such as shown in FIG. 1. The system provides a graphical, visual representation, such as a maps as illustrated in FIGS. 2A and 2B, linking objects and illustrating cash flow between the objects.

Figure 3:
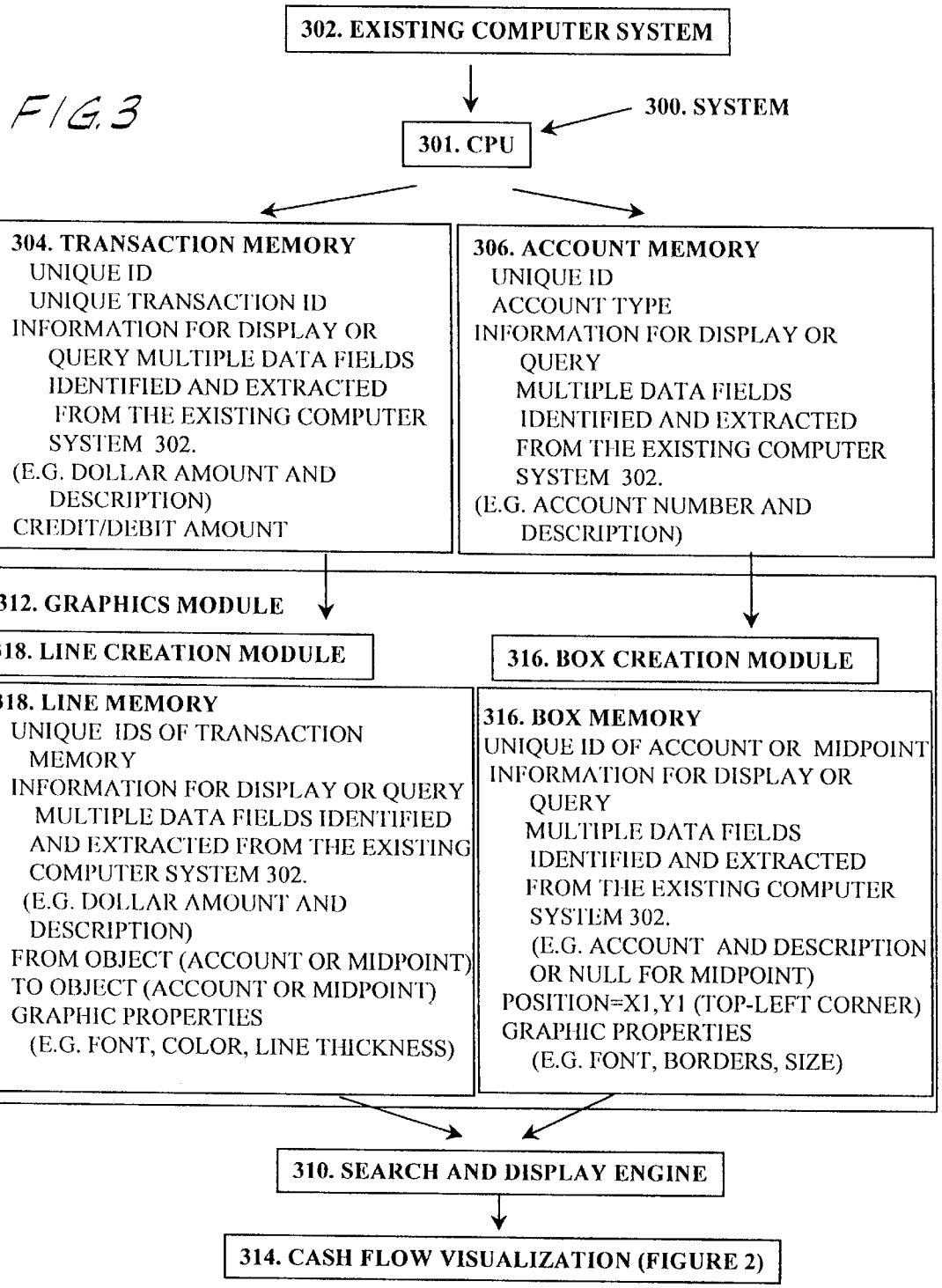
FIG. 3 is a block diagram of the system according to the invention illustrating the various types of memory.
Figure 4B:
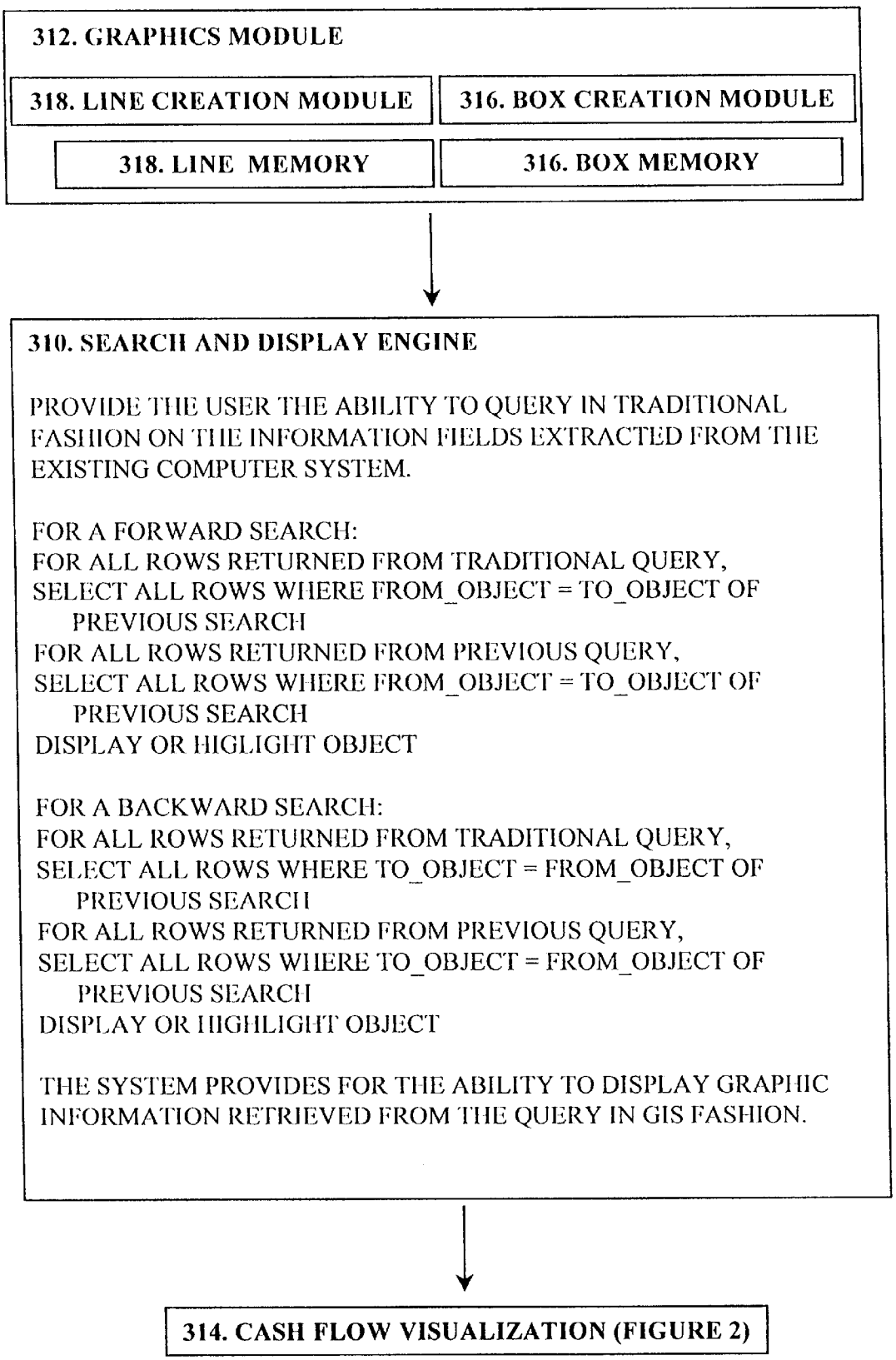
FIG. 4B is a flow chart of the operation of a software search and display engine according to the invention illustrating the selection and display of graphic objects.

As illustrated in FIG. 3, the system 300 of the invention is structured around a central processing unit (CPU) 301 linked to an existing computer system 302. Textual information records are supplied to the system 300 from the user's existing computer system 302. A textual information record comprises multiple formats. The textual information record format is the format of the computer file in which the textual information records are supplied. New types of textual information record formats require modifications to an interface program resident in the CPU 301. The interface program is a format translator which is used to format the user's record format to the format required by the system. Record re-formatting logic is common programmer knowledge. The reformatting must extract the fields required by the graphics module and reformat the output format from the existing computer system 202 to the input format of the system.

For line items of a general ledger module—credit/debit transactions—depicted in FIG. 1 and FIG. 2A.

The required information for a box memory is the account number (unique identification of object), account type (e.g., expense account, liability account, allocation account), account description, and multiple fields for the user to include additional information for query or display.

The required information for a line memory is the unique ID comprising the transaction number and line entry number, multiple fields for the user to include additional information for query or display. Most importantly, the "to" and "from" objects must be identified. For credit entries, the "from" object is the account number on the line entry; the "to" object is a "midpoint." A "midpoint" is a single point, a placeholder, with a unique ID, between all points of the transaction, to which all line entries of a transaction will be joined. By definition of a credit/debit transaction, the total of all debits must equal the total of all credits. For debits entries, the "from" object is the "midpoint;" the "to" object is the account number on the line entry.

In this way of linking from-to-from-from-to-from, etc., cash flow is derived. Different types of transactions can be processed, each requiring a modification of the reformatter program to extract and reformat the required information above. For report writer transactions, the "from" line is the account on the line entry; the "to" account is the line of the report, i.e., a box is created to represent each line of the report.

The input files for lines on the diagram contain textual information records supplied from the user's computer system 302. Each input file has a different format, and contains a different type of information. Four (4) types of information files are processed in this version of the system: General Ledger transactions, Job Cost transactions, Payroll transactions, relationships between Job Cost levels of detail. For each textual information record in each file, the software system will create a line on the diagram.

The process of re-formatting is to rearrange the elements of the textual information records of the user's computer system 302 to the format required as input to the system 300. The system 300 includes a line item memory such as transaction memory 304 for storing entries relating to the line entries of files to be analyzed. The system 300 also includes account memory 306 for storing information relating to the account. Means are also included for inputting the line entries of the file into the transaction memory and into the appropriate account memory. As illustrated in FIG. 3, the means includes the central processing unit 301 and interface program which interfaces the existing computer system 302 with transaction memory 304 and with the account memory 306. However, it is also contemplated that the input means may be any interface known in the art such as a keyboard or scanner.

One important aspect of the invention is a search engine 310 for searching the memories 304, 306 and locating the line entries which relate to each of the user-specified criteria. The search engine 310 interfaces with a graphics module 312 which is responsive to the search engine 310 and which is also responsive to the line entries which are located by the search engine 310. The graphics module 312 creates a visual graphic map 314 as shown in FIG. 2 interrelating the flow between the objects or accounts whereby the map 314 provides the graphical representation interrelating the objects or accounts.

In one preferred embodiment, the system 300 of the invention is for use in mapping financial transactions from a general ledger module. FIG. 1 illustrates five such transactions. General ledger transactions may fall into four categories: transactions having multiple debits and a single credit; transactions having multiple debits and multiple credits; transactions having a single debit and a single credit; and transactions having a single debit and multiple credits. As shown in FIG. 1, transactions 1 and 2 illustrate the first type of transaction, transaction 3 illustrates the second type and transactions 4 and 5 illustrate the fourth type of transaction. Transaction 3 is actually three separate transactions (a, b, c) which are related to accounts payable and treated as a single transaction for simplicity. Each transaction has a line entry. For example, transaction 1 has seven line entries numbered 1–7. Transaction 2 has seven line entries numbered 1–7. Transaction 3 (a, b, c) and transactions 4 and 5 have two line entries. Each line entry relates to a particular account and has a money entry in a debit field or in a credit field. For example, line entry 1 of transaction 1 relates to office supplies G&A account number 525-110 and has a debit entry of $735.43. As another example, line entry 1 of transaction 2 relates to telephone G&A account number 555-1110 and includes a debit entry of $474.75 which is a money entry in the debit field. As another example, line entry 4 of transaction 2 relates to telephone E/ON account number 555-500 and includes a debit entry for $1,213.02. As another example, line entry 5 of transaction 3 relates to accounts payable number 201-010 and includes a credit entry of $592.86 as a money entry in the credit field.

For credit/debit transactions from a general ledger module the line entries move cash from account to account. For report line definitions from a report writer module, the line entries move cash from general ledger account to line entry on the report. For job cost transactions, the line entries move cash throughout the job cost hierarchy forward to the general ledger. Non-cash items can also be tracked, for example, the relationship of check number to invoice number merely mapping the relationship between two objects.

As with any system of the invention, the financial transaction mapping system provides a graphical, visual representation which links the various accounts, such as linking the expense account and the liability account and which illustrates cash flow showing money contributing to an account and showing money distributed from an account. FIGS. 2A and 2B are illustrations of such a map and will be discussed in greater detail below.

In the embodiment for mapping financial transactions, the system 300 includes the transaction memory 304 for storing entries relating to the transactions, the expense account memory 306 for storing entries relating to the account. Other accounts such as liability or allocation accounts may be part of the system. As with the general system, the financial transaction mapping system includes means for inputting the line entries of the transactions into the transaction memory 304 and into the account memory 306. Preferably, the central processing unit 301 interfacing between the existing computer system 302 would provide such input. The search engine 310 which may be resident within and operated by the CPU 301 searches a line memory 318M populated by a line creation module 318 and searches a box memory 316M populated by a box creation module 318 to locate the line entries of the particular transactions which contributed money to each of the accounts and also locates the line entries which distributed money from each of the accounts. Finally, the graphics module 312 which also may be resident in and operated by the CPU 301 responds to the search engine 310 and the located line entries. The graphics module 312 displays the map 314 highlighting the money flow between the accounts whereby the map provides the graphical representation interrelating the accounts as shown in FIGS. 2A and 2B.

In one preferred embodiment, the graphics module 312 includes a box creation module 316 for creating a box for each account. The box creation module 316 assigns a unique identifier to each account memory and displays information relating to each account memory such as the dollar amount and description of the account. The box creation module 316 also defines the graphic properties of the box such as the type of font, borders, size, and so on.

The graphics module 312 also preferably includes a line drawing module 318 for drawing lines interconnecting the boxes created by the box creation module 316. The line drawing module 318 assigns unique identifiers to each transaction memory and displays information such as dollar amount and description for various line entries. The line drawing module 318 establishes graphic properties for the lines such as font, color, and line thickness, attributes about the line (e.g., thicker lines represent credits, thinner lines represent debits, online, colors of green, red, and gray are used to distinguish credit/debit and other types of transactions; segments for square lines).

The input files for boxes contain textual information records supplied from the user's computer system. 302 Each input file has the same format, but contains a different type of information. In one preferred embodiment, five (5) types of information files are processed in this version of the system: Expense Accounts, Balance Sheet Accounts, Profit and Loss Accounts, Job/Phase numbers, and Categories (sub-job numbers) from a commercially available accounting package and job cost module. For each textual information record in each file, the system 300 will create a text box on the diagram. The box is defined as an accumulation pool.

Preferably, each type of information is provided in a separate file. Overall, this is immaterial to the logical design of the system. Other versions of the software may process records from a single input file, using ranges of account numbers to distinguish type of information record. It is a matter of designer preference and software sophistication as to whether the textual information records are provided in a single file or in multiple files. A critical criteria is that the records must be distinguishable by type. For each type, a starting position must be specified and the size (dimension) of that type box. The information is best kept in a parameter file, with information supplied from the user.

The objects created via the invention were imported to MapInfo, a commercially available graphics program. The search engine can execute a forwards search in the following manner. A criteria is identified by the user for search. An SQL statement is written to retrieve all level 1 objects matching the search criteria; an SQL statement is written for all objects retrieved, the "To" object is used as criteria to retrieve all level 2 objects with "From" equal the "To" of the level 1 objects; an SQL statement is written for all objects retrieved, the "To" object is used as criteria to retrieve all level 3 objects with "From" equal the "To" of the level 2 objects. This process of iterative search can be repeated n levels deep; a not found condition marks the end of the cash flow.

The search engine also can execute a backwards search. A criteria is identified by the user for search. An SQL statement is written to retrieve all level 3 objects matching the search criteria; an SQL statement is written for all objects retrieved, the "From" object is used as criteria to retrieve all level 2 objects with "To" equal the "From" of the level 3 objects; an SQL statement is written for all objects retrieved, the "From" object is used as criteria to retrieve all level 1 objects with "To" equal the "From" of the level 2 objects. This process of iterative search can be repeated n levels deep; a not found condition marks the end of the cash flow.

This search function was performed by manual procedures. The manual execution of the search engine is immaterial. The iterative manual process can be replaced with iterative program logic with the same result. The search mechanism (depth nodal search) is common programmer knowledge, simply as artificial intelligence.

The search function was performed automatically using a MicroStation "Macro" which animates cash flow 3 levels deep, as shown in FIG. 2B.

A positioning algorithm in Appendix 1, pages A25–A30, A37–A55 and A110–A131 (Program Name: Position), uses a Positioning Parameter File to define the position of each box on the diagram. The Positioning Parameter File lists the name of each input file, and the starting position for each file. The starting position is the top left point (x-coordinate and y-coordinate) from which all boxes created for all records of that file will be positioned.

A box is created for every textual information record of the input files. Each box from the input file will be positioned in a column beginning at the starting point for the file. The boxes are of a standard size, and the position of each box is calculated as an offset from this starting position of that type. The position of each box is an offset from the starting position, calculated by taking the starting position, the number of boxes created, and the size of each box.

Appendix 1, pages A30–A34, A56–A74 and A132–A146 set up intermediate files used in processing (Program Name: Transmid). The intermediate files are processed into graphic line objects in a Line Creation Module illustrated at pages A34–A36, A75–A109 and A183–A209 (Program Name: Account). The basic action is to preprocess the textual records for input to subsequent Line Creation Software Module. They hold the information records during processing by a Line Preprocessing Software Module and a Line Creation Software Module.

FIG. 2A illustrates one preferred embodiment of a graphical, visual representation or map of the transactions illustrated in FIG. 1. Boxes 201–215 represent expense accounts, the information for which would be stored in account memory 306 with type="expense." Boxes 216 and 217 represent liability accounts, the information for which would be stored in account memory 306 with type= "liability." Boxes 218 and 219 represent allocation accounts which information would be stored in an account memory 306 with type="allocation." The boxes are generated by the box creation module 316. It is noted that FIG. 2A includes 19 boxes whereas FIG. 1 lists 24 different line entries. This is because several of the line entries in FIG. 1 relate to the same account number. For example, line entry 7 of transaction 1 and line entry 1 of transaction 5 each relate to account number 625-999 for office supplies. In addition, lines can often relate to the same account. Different techniques for compressing lines displayed are predicted. Between box 218 and boxes 202, 204, 206, 208, 211, and 213, a wide line 220 illustrates that the credit line entry 7 of transaction 1 stems from a plurality of six (6) narrow lines 221–226 which represent debit line entries 1–6 of transaction 1. For convenience, the money amounts corresponding to each line are illustrated in FIG. 2A. However, it is contemplated that such amounts would not normally be displayed. A user would merely designate or click on a particular line to display the money amount which the line represents. This reduces the clutter of the map and allows the user to only display those money amounts which are of interest. Multiple enhancements and variations to this and other display features are possible.

Similarly, between box 219 and boxes 203, 205, 207, 209, 212, and 214, a wide line 227 illustrates credit line entry 7 of transaction 2. This line stems from a plurality of six (6) narrow lines 228–233 which illustrate the six (6) debit field money entries corresponding thereto. With regard to transaction 3, between box 216 and boxes 217, 210, and 215, a wide line 234 corresponds to a narrow line 235, a wide line 236 corresponds to a narrow line 237 and a wide line 238 corresponds to a narrow line 239. With regard to transaction 4, between box 216 and box 201, a wide line 240 corresponds to a narrow line 241. With regard to transaction 5, between box 218 and box 219, a wide line 242 corresponds to a narrow line 243.

The version of the software documented in the Appendices contains four types of lines: simple credit/debit (e.g., lines 240, 241) complex credit/debit (e.g., lines 220 and 221–226), square credit/debit (e.g., lines 234 and 235) and accumulation (e.g., a single gray line of constant width, not shown in FIG. 2). The line type determination and positioning of each type of line is slightly different. For a simple or complex line, a midpoint is created at the average x and y position, and line segments are drawn between the accounts and the midpoint.

A line is created for every textual information record of the input files. The basic action of drawing a line is common programmer knowledge, subject to the application environment. (In this version of the software, the objects will be displayed in a commercial product, MapInfo desktop mapping package, therefore the objects are drawn as data specifications in MapInfo Exchange Format to be imported as objects to MapInfo).

The critical feature of each of the lines is that the line is stored with "where it came from" and "where it goes to" (i.e. child/parent relationships) from the boxes created above. The lines link the boxes together. The positioning algorithm in the Line Creation Software Module 318 locates the parent using textual field values, and retrieves the position of the box as computed from the Box Creation Software Module 316. The same is done for the child. The Line Creation Software Module 318 draws the line "from" the parent box "to" the child box.

In addition, lines can often relate to the same account. Different techniques for compressing lines displayed are predicted. Identical transactions will produce a set of lines which overlays another set of lines. Only one set of lines will be visible.

As a result, FIG. 2A illustrates a graphical, visual representation linking the accounts of transactions 1–5 of FIG. 1 and illustrating cash flow showing money contributing to an account and showing money distributed from an account. For example, it is difficult to look at FIG. 1 and determine which line entries are being distributed from accounts payable number 201-010. However, a cursory review of FIG. 2 immediately illustrates that transactions 3 and 4 distribute money from accounts payable box 216 into boxes 201, 210, 215 and 217. In particular, lines 240, 234, 236, and 238 show that cash is flowing into the following accounts: meals MKTG number 517-110 (box 201); equipment leases E/ON number 567-500 (box 210); interest expense number 931-900 (box 215); and current OBLIG/CAP LEASE number 203-010 (box 217). The map of FIG. 2 also allows the user to immediately determine that money flows from accounts payable box 216 to expense accounts boxes 201, 210 and 215 and to a liability account box 217. Similar observations can be made with respect to the other accounts. As a result, cash flow can be visually tracked and abnormalities easily identified from normal system operation.

A cursory review of the map of FIG. 2 also allows design review so that conformance to accounting standards or discrepancies can be evaluated. For example, accounting principles may suggest that liability accounts should not transfer amounts between certain accounts, so that line entries 1 and 2 of transaction 3 must be rewritten. Any discrepancies in the principle or design may also be detected by visual evaluation. Also, the map of FIG. 2 is derived from the historical data of FIG. 1 so that the map of FIG. 2 illustrates the various financial or general ledger transactions of FIG. 1, each transaction having line entries which are represented by wide or narrow lines, each line being simple, complex, square, or gray, each line entry relating to a particular account. All these matters are interrelated by the map of FIG. 2. Finally, other transactions which relate to the accounts of FIG. 2 can be related to FIG. 2 by maps similarly generated based on the other transactions so that a diagram of the other transactions can be linked to the map of FIG. 2. FIG. 2 shows a search 1 level deep. FIG. 2B was created in the same fashion as FIG. 2A, but shows 3 levels deep—the search and visualization can represent searches n levels deep. In addition, the display is at a different resolution. Resolution and Zooming are display features of common graphics programmer knowledge.

FIG. 2A illustrates a cash flow analysis. However, it is contemplated that any type of analysis or tracking could be illustrated according to the invention. For example, the transactions could each relate to separate sales orders, invoices, and checks and could be tracked in that manner by a map according to the invention. FIG. 2 is an illustration of one type of transaction from a General Ledger module. Other existing computer system modules which the system could interface include but are not limited to payroll, general ledger, purchase order, order entry, accounts payable, inventory control, manufacturing, report writer modules, and accounts receivable. In any case, information would be mapped using the modes of operation of the system.

The following depicts typical textual input information records. In this example, transactions are from an accounting system.

Step 1. The input source of the boxes can be extracted from the transaction files (as will be described in this case) or a listing of all boxes available in the system, as is usually the input source. In this case, the input source files are preprocessed to extract all Account/Descriptions. The file of boxes-to-be is sorted, and any duplicate unique keys are eliminated.

Step 2. The parameter file must be supplied. The file would contain the following:

Range: 000 000-999 999 x1, y1
Range: 000 100-999 998 x2, y2
Range: 001 999-999 999 x1, y3

The concept of ranges of accounts is common accounting system logic. Ranges of accounts are considered analogous to types of accounts (e.g., expense, liability, allocation, etc. by those in the field). The parameter file states the starting position for each range of accounts. All accounts falling in that range will be processed and offset from the starting point.

Step 3. The Box Creation Module 316 creates the boxes. Starting at position x1,y1 all accounts in the specified range type are created and positioned. Account 201-010 is the first box 216 in the range and is created at position x1,y1 (the starting position). The second box 217 (account 203-010 is created positioned at x1,y1+standard offset for that type. The third through 17th boxes 201–215 (column on right) are created at position x1,y1+standard offset for that type multiplied by the box number. The last two boxes 218 and 219 (account 625-999 and 655-999) are created at position x1,y3 and x1,y4. The account number (unique identifier) and possibly other tag information from the existing computer system and position are stored for display or query. The boxes may be "dragged" online and repositioned. The lines will reposition accordingly.

Step 4. The textual information records are made into lines. A transaction specifies all the boxes which must be joined. In the first transaction, a set of textual information records, six lines are linked to one line (the dollar totals of any one transaction must equal et 0). This is a Complex Transaction.

The processing program finds the position of all boxes connected. A midpoint is created at position xm,ym: xm is halfway between the greatest and least x values of all boxes joined, and ym is halfway between the greatest and least y values of all boxes joined. The midpoint is stored in the box memory with a position, the "to" objects and "from" objects to which the midpoint is joined. By convention, from-to is left-right.

This logic is true for simple transactions, and accumulation lines. Accumulation lines do not require midpoints, such as for joining an account to a report line. If the x-value of any two objects to join is the same, a "loop" or square line will be drawn. The x-values are determined by the position of the origin box, the bend occurs at a specified offset to the right. The y-value of the square line begins at the box, and ends halfway between the greatest and least y values of all boxes joined.

Step 5. The diagram is interactive online. When the user "clicks" on an object, corresponding information is displayed as hypertext. For example, dollar volume of each transaction, or balance of accumulation pools.

Another use of the mapping software is for mapping algebraic notation of chess games. Modifications of the Accounting Maps software required for chess game mapping are: the "from" is defined as the current move, and the "to" is defined as the next move in the game; white moves and black moves are different types with different icons (white squares as the icon for white's moves and black squares as the icon for black's moves); the positioning program creates boxes the same, but positions the boxes in a symmetrical tree pattern (as opposed to a columnar pattern of boxes)—this ability to position objects in a tree shape diagram is common programmer knowledge—moves are striated into y-levels corresponding to the move number of the game; the x-position is the average of the x-positions of all children objects of the object.

In view of the above, it will be seen that the several objects of the invention are achieved and other advantageous results attained.

The Chess Maps Processing System is the Maps Software System modified in the following ways. The boxes are small squares, color coded as white's move or black's move; the algebraic notation of the move is listed below the box. The positioning algorithm creates a directed graph of the boxes, as opposed to the columns of boxes with starting positions described in the Accounting Maps Processing System. The positioning algorithm for a directed graph is common programmer knowledge. The x-position begins by dividing the area size by the number, of games (unique endings). The ending move of each game is positioned at this x-value; the x-position of any object thereafter is computed as the average x-value of all its children objects. The y-value is computed as a standard relation to the game move number, e.g., all move 1 white boxes occur at y-position y1, all move 1 black boxes occur at y-position y2, etc.

FIG. 5 depicts typically textual input information records, i.e., algebraic notation of games (this is the standard way of recording chess games). In FIG. 5, three games are presented, moves 1–5 only:

Step 1. The input source of the boxes is an algebraic listing of the games to be processed. The format of the notation can change, requiring changes to the preprocessing module. The general listing of moves is common to all formats, and is used to draw the diagram. The input file is sorted by moves.

Step 2. The positioning of the directed graph proceeds by counting the number of games processed. This count divides the drawing area and determines the x-coordinate of each of the top boxes (a6, d5, $Bg_4$).

Step 3. The Box Creation Module creates the boxes. White boxes for white's moves and black boxes for black's moves. The boxes for the last moves are the first boxes drawn. The algorithm then steps back through the games, adding boxes to complete the game tree. When a common history is detected, the algorithm creates a single box, and joins all games with the common history to that box.

As various changes could be made in the above products and methods without departing from the scope of the invention, it is intended that all matter contained in the above description and shown in the accompanying drawings shall be interpreted as illustrative and not in a limiting sense.

What is claimed is:

1. A system for use in mapping items, each item having line entries, each line entry relating to a particular object, said system for providing a graphical, visual representation linking objects and illustrating flow between the objects, said system comprising:

an item memory for storing entries relating to the items wherein the items are selected from the following group: financial system transactions including general ledger, lob cost, accounts payable, accounts receivable, sales order, invoicing, payroll, fixed assets and inventory, and cost management; and management systems transactions including shop floor, maintenance, and warehouse;

a first object memory for storing entries relating to a first object;

a second object memory for storing entries relating to a second object;

means for inputting the line entries of the items into the item memory and into the appropriate object memory;

a search engine for searching the item memory and the object memories and locating the line entries which relate to each of the objects; and a graphics module responsive to the search engine and to located line entries creating a map interrelating the flow between the objects whereby the map provides the graphical representation interrelating the objects.

2. The system of claim 1 wherein the first object is an expense account or a debit account and wherein the second object is a liability account or a credit account so that the map interrelates the expense and liability accounts and/or interrelates the debit and credit accounts and other such common accounting operations.

3. The system of claim 1 wherein the graphics module includes a box creation module for creating a box for each object and a line drawing module for drawing lines interconnecting the boxes, the lines representing the flow between the objects of the connected boxes.

4. The system of claim 1 wherein the search engine searches the memories backwards by locating the line entries which contributed to a particular object and wherein the search engine searches the memories iteratively by locating the line entries which contributed to the particular object.

5. The system of claim 1 wherein the search engine searches the memories forwards by locating the line entries which distributed from a particular object and wherein the search engine searches the memories iteratively by locating the line entries which distributed from the particular object.

6. The system of claim 1 further comprising a database query language for querying the fields of interest designated by a user and wherein the graphics module displays the graphics associated with the results of the queries designated by the user.

7. The system of claim 1 for use in mapping financial transactions, each transaction having line entries, each line entry relating to a particular account and having a money entry in a debit field or in a credit field, said system for providing a graphical, visual representation linking accounts and illustrating cash flow showing money contributing to an account and showing money distributed from an account, wherein the item memory comprises a transaction memory for storing entries relating to the transactions;

wherein the first object memory comprises a first account memory for storing money entries relating to a first account;

wherein the second object memory comprises a second account memory for storing money entries relating to a second account;

wherein the inputting means comprises means for inputting the line entries of the transactions into the transaction memory and into the appropriate account memory;

wherein the search engine comprises a search engine for searching the transaction memory and the account memories and locating the line entries which contributed money to each of the accounts and locating the line entries which distributed money from each of the accounts; and wherein the graphics module comprises a graphics module responsive to the search engine and the located line entries for creating a map interrelating the money flow between the accounts whereby the map provides the graphical representation interrelating the accounts.

8. The system of claim 7 wherein the first account is an expense account and wherein the second account is a liability account so that the map interrelates the expense account and the liability account and other such common accounting operations.

9. The system of claim 7 wherein the graphics module includes a box creation module for creating a box for each account and a line drawing module for drawing lines interconnecting the boxes, the lines representing the cash flow between the accounts of the connected boxes.

10. The system of claim 7 wherein the search engine traces the pattern of cash flow by searching the memories backwards by locating the line entries which contributed money to a particular account and by searching the memories iteratively by locating the line entries which contributed money to the particular account.

11. The system of claim 7 wherein the search engine traces the pattern of cash flow by searching the memories forwards by locating the line entries which distributed money from a particular account and by searching the memories iteratively by locating the line entries which distributed money from the particular account.

12. The system of claim 7 further comprising a database query language for querying the fields of interest designated by a user and wherein the graphics module displays the graphics associated with the results of the queries designated by the user.

13. A tool for creating a map of financial transactions, each transaction having line entries, each line entry relating to a particular account and having a money entry in a debit field or in a credit field, said map providing a graphical, visual representation linking accounts and illustrating cash flow showing money contributing to an account and showing money distributed from an account, said tool for use with a system having an expense account memory for storing money entries relating to an expense account, and having a liability account memory for storing money entries relating to a liability account; said tool comprising:

a search engine for searching the memories and locating the line entries which contributed money to an account and locating the line entries which distributed money from an account; and a graphics module creating a map interrelating the money flow between the accounts whereby the map provides the graphical representation interrelating the accounts.

14. The tool of claim 13 wherein the graphics module includes a box creation module for creating a box for each account and a line drawing module for drawing lines interconnecting the boxes, the lines representing the cash flow between the accounts of the connected boxes.

15. The tool of claim 13 wherein the search engine traces the pattern of cash flow by searching the memories backwards by locating the line entries which contributed money to a particular account and by searching the memories iteratively by locating the line entries which contributed money to the particular account.

16. The tool of claim 13 wherein the search engine traces the pattern of cash flow by searching the memories forwards by locating the line entries which distributed money from a particular account and by searching the memories iteratively by locating the line entries which distributed money from the particular account.

17. The tool of claim 13 further comprising a database query language for querying the fields of interest designated by a user and wherein the graphics module displays the graphics associated with the results of the queries designated by the user.

* * * * *